United States Patent
He et al.

(10) Patent No.: US 12,494,805 B1
(45) Date of Patent: Dec. 9, 2025

(54) OPTIMIZING COEXISTENCE OF RADIO SIGNALS IN A WEARABLE DEVICE

(71) Applicant: Meta Platforms Technologies, LLC, Menlo Park, CA (US)

(72) Inventors: Fei He, Santa Clara, CA (US); Qiuming Li, Palo Alto, CA (US); Jie Song, Fremont, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 425 days.

(21) Appl. No.: 18/082,887

(22) Filed: Dec. 16, 2022

(51) Int. Cl.
    *H04B 1/04* (2006.01)
(52) U.S. Cl.
    CPC ....... *H04B 1/04* (2013.01); *H04B 2001/0408* (2013.01); *H04B 2001/0491* (2013.01)
(58) Field of Classification Search
    CPC .............. H04B 1/04; H04B 2001/0408; H04B 2001/0491
    See application file for complete search history.

(56) References Cited

U.S. PATENT DOCUMENTS

| | | | | |
|---|---|---|---|---|
| 8,473,006 | B1 * | 6/2013 | Halferty | H04W 36/304 370/312 |
| 11,184,917 | B2 * | 11/2021 | Zacharias | G01S 19/12 |
| 2020/0092730 | A1 * | 3/2020 | Thubert | H04W 24/08 |

FOREIGN PATENT DOCUMENTS

EP  3148238 A1 *  3/2017 ............ H04W 16/14

* cited by examiner

*Primary Examiner* — Siu M Lee
(74) *Attorney, Agent, or Firm* — Foley & Lardner LLP

(57) ABSTRACT

Disclosed herein are related to a device that can include a first circuit and second circuit each configured for a communications protocol, the second circuit configured to determine a loss caused by an interference from the first wireless communications protocol. The device includes a controller circuit configured to: determine, in response to the loss and according to a state of the circuits, a configuration for operating at least one of the first circuit or the second circuit. The state includes a power of a signal of the second wireless communication protocol, and at least one of: a frequency of the first circuit, a modulation of the first circuit, a power of a signal of the first wireless communications protocol or a frequency of the second circuit. The device can apply the configuration to at least one of the first circuit or the second circuit to adjust the loss.

20 Claims, 8 Drawing Sheets

OPTIMIZING COEXISTENCE OF RADIO SIGNALS IN A WEARABLE DEVICE

FIELD OF DISCLOSURE

The present disclosure is generally related to facilitating wireless communication in devices, including but not limited to reducing wireless communication interference in a wearable device.

BACKGROUND

Developments in computing and communication devices have prompted growth in wearable technology. Wearable devices may utilize various radio signals to facilitate a multitude of simultaneous communications. For example, a wearable device may access content over a network and control or communicate with other computing devices. For example, a wearable device may place a phone call over a cellular signal while simultaneously maintaining a WiFi connection.

SUMMARY

The present disclosure relates to a solution for reducing harmonic interferences caused by radio coexistence between radio frequency (RF) circuits while improving energy efficiency of the system. In wearable and mobile handheld devices for instance, radio signal coexistence can create challenges to different wireless communication systems experiencing RF interference. For example, an electronic device or a system can include radio components or circuits experiencing harmonic interference from another RF transmitter of the system. While sometimes RF interference can be reduced by operating a power amplifier (PA) at a higher linearity or adjusting the impedance of the circuit antennas, such measures can consume more power and reduce the energy efficiency of the system. Therefore, radio coexistence events can cause a trade-off between a poor user experience caused by radio coexistence interference losses in the wireless communication on the one side and the reduced energy efficiency of the system on the other. The present solution addresses these issues by adjusting configuration settings of the RF circuits in response to the detected loss using information in a lookup table to adjust the operation of the RF components while maintaining the coexistence losses between the RF circuits within an acceptable range. The present solution can categorize conditions (e.g., states) of the RF circuits as entries in the lookup table corresponding to mitigation adjustments or configurations that can be applied to the RF components in order to make the adjustments. The solution can select the most suitable mitigation adjustments (e.g., configurations) based on a scoring system, which once applied causes the PAs, tuners and/or the antennas of the RF components to be adjusted accordingly, keeping coexistence loss below an acceptable threshold and at an improved energy efficiency of the system.

In some aspects, the present disclosure relates to a device. A first circuit can be configured for a first wireless communications protocol. A second circuit can be configured for a second wireless communications protocol. The second circuit can be configured to determine a loss caused by an interference from the first wireless communications protocol. A controller can be configured to determine a configuration for operating at least one of the first circuit or the second circuit in response to the loss exceeding a defined threshold and according to a state of the first circuit and of the second circuit. The state can include at least a power of a signal of the second wireless communication protocol received at the second circuit. The state can include and at least one of: a frequency of the first circuit, a modulation setting of the first circuit, a power of a signal of the first wireless communications protocol or a frequency of the second circuit. The controller circuit can be configured to apply the configuration to at least one of the first circuit or the second circuit to adjust the loss.

In some embodiments, the controller circuit can be configured to operate an amplifier of the first circuit in a high linearity mode by adjusting at least one of: a voltage supplied to the amplifier, a bias of the amplifier or a collector current at a bias point (ICQ) of the amplifier. The controller circuit can be configured to operate the amplifier of the first circuit in a normal linearity mode, in response to the loss being below the defined threshold or an absence of the interference. The controller circuit can be configured to adjust at least one of an impedance of an antenna of the first circuit or an impedance of an antenna of the second circuit.

In some embodiments, the controller circuit can be configured to adjust a voltage supplied to an amplifier of the first circuit, a collector current at a bias point (ICQ) of the amplifier of the first circuit and at least one of an impedance of an antenna of the first circuit or an impedance of an antenna of the second circuit. The controller circuit can determine the configuration by identifying, from a data structure including one or more configurations corresponding to the state, the configuration as a configuration having a highest score among one or more scores of the one or more configurations corresponding to the state.

In some embodiments, the controller circuit can determine the configuration by identifying, from a data structure including one or more configurations corresponding to the state, the configuration as a configuration having a score lower than a highest score among one or more scores of the one or more configurations corresponding to the state. The score can be identified in response to the configuration corresponding to the highest score being unsuitable. The device can includes a memory configured to store a data structure including a plurality of states of the first circuit and the second circuit. Each of the states can correspond to one or more configurations for operating at least one of the first circuit or the second circuit, each of the one or more configurations having a respective score.

In some aspects the present disclosure relates to a method. The method can include causing, by a first circuit configured for a first wireless communications protocol, interference to a second circuit configured for a second wireless communications protocol. The method can include determining, by the second circuit, a loss caused by the interference. The method can include determining, by a controller circuit, in response to the loss exceeding a defined threshold and according to a state of the first circuit and the second circuit, a configuration for operating at least one of the first circuit or the second circuit. The state can include a power of a signal of the second wireless communication protocol received at the second circuit and at least one of a frequency of the first circuit, a modulation setting of the first circuit, a power of a signal of the first wireless communications protocol or a frequency of the second circuit. The method can include applying, by the controller circuit, the configuration to at least one of the first circuit or the second circuit to adjust the loss.

In some embodiments, the method includes adjusting at least one of a voltage supplied to the amplifier, a bias of the amplifier, or a collector current at a bias point (ICQ) of the amplifier and operating, by the controller circuit, an amplifier of the first circuit in a high linearity mode according to the adjusting. The method can include operating, by the controller circuit, the amplifier of the first circuit in a normal linearity mode, in response to the loss being below the defined threshold or an absence of the interference. The method can include adjusting, by the controller circuit, at least one of an impedance of an antenna of the first circuit or an impedance of an antenna of the second circuit.

In some embodiments, the method includes adjusting, by the controller circuit, a voltage supplied to an amplifier of the first circuit, a bias of the amplifier of the first circuit, a collector current at a bias point (ICQ) of the amplifier of the first circuit and at least one of an impedance of an antenna of the first circuit or an impedance of an antenna of the second circuit. The method can include determining the configuration for operating the at least one of the first circuit of the second circuit includes identifying, by the controller circuit from a data structure, the data structure including one or more configurations corresponding to the state, the configuration as a configuration having a highest score among one or more scores of the one or more configurations corresponding to the state.

In some embodiments, determining the configuration for operating the at least one of the first circuit or the second circuit includes identifying, by the controller circuit from a data structure including one or more configurations corresponding to the state, the configuration as a configuration having a score lower than a highest score amongst the one or more scores of the one or more configurations corresponding to the state. The score can be identified in response to the configuration corresponding to the highest score being unsuitable. The method can include storing, by a memory, a data structure. The data structures can include a plurality of states of the first circuit and the second circuit, each of the states corresponding to one or more configurations for operating at least one of the first circuit of the second circuit, each of the one or more configurations having a respective score.

In some aspects the present disclosure relates to a non-transitory computer readable medium storing program instructions. The program instructions can cause at least one processor of a device to determine a loss caused by interference from a first circuit configured for a first wireless communications protocol, to a second circuit configured for a second wireless communications protocol. The program instructions can cause the at least one processor to determine, in response to the loss exceeding a defined threshold and according to a state of the first circuit and the second circuit, a configuration for operating at least one of the first circuit or the second circuit. The state can include a power of a signal of the second wireless communication protocol received at the second circuit and at least one of a frequency of the first circuit, a modulation setting of the first circuit, a power of a signal of the first wireless communications protocol or a frequency of the second circuit. The program instructions can cause the at least one processor to to apply the configuration to at least one of the first circuit or the second circuit to adjust the loss.

In some embodiments, the program instructions can cause the at least one processor to adjust at least one of a voltage supplied to the amplifier, a bias of the amplifier, or a collector current at a bias point (ICQ) of the amplifier. The program instructions can cause the at least one processor to operate an amplifier of the first circuit in a high linearity mode according to the adjusting. The program instructions can cause the at least one processor to operate the amplifier of the first circuit in a normal linearity mode, in response to the loss being below the defined threshold or an absence of the interference. The program instructions can cause the at least one processor to adjust a voltage supplied to an amplifier of the first circuit, a bias of the amplifier of the first circuit, a collector current at a bias point (ICQ) of the amplifier of the first circuit and at least one of an impedance of an antenna of the first circuit or an impedance of an antenna of the second circuit.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
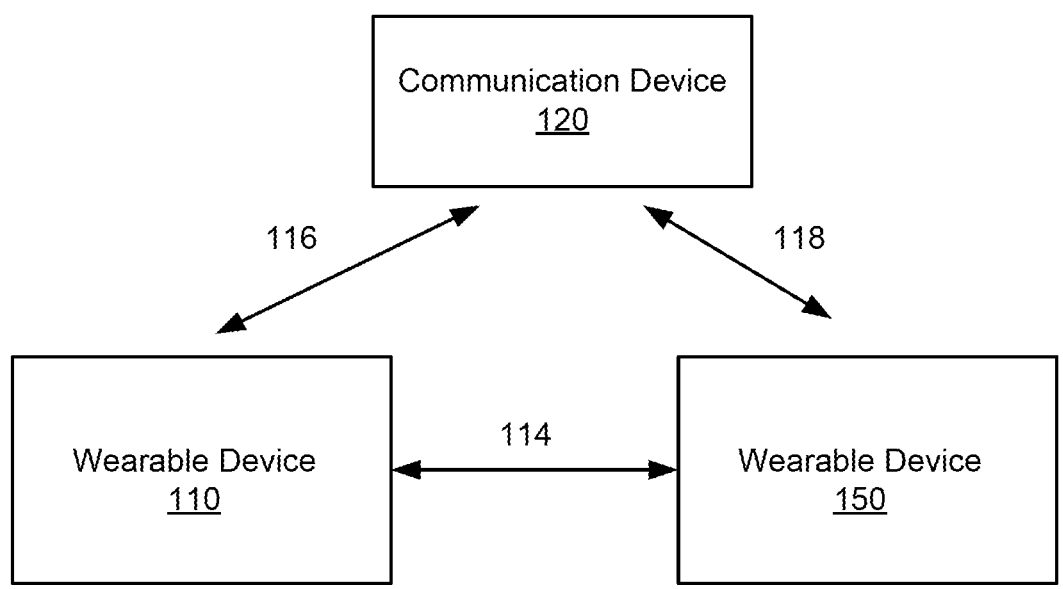
FIG. 1 is a diagram of a system environment including wearable devices, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are embodiments related to a solution for reducing harmonic interferences caused by radio coexistence between different RF circuits while improving the energy efficiency of the system. In wearable and mobile handheld devices, radio coexistence can create various challenges to operation of different wireless communication systems. For example, an electronic device or a system can include different radio components or circuits experiencing harmonic interference between each other, including for example transmitters or receivers for cellular, E-UTRAN New Radio-Dual connectivity (ENDC), global positioning system (GPS), Wireless Fidelity (WiFi), Bluetooth and/or ultra-wide band (UWB) communication technology. In order to reduce the interference and the corresponding coexistence loss of the RF components, adjustments can be made to the system, such as for example to operate power amplifiers (PA) of the wireless circuits at a higher linearity. However, operating a PA at a higher linearity range than the linearity range of the normal operating mode of the PA can lead to higher power consumption by the PA, and therefore reduced energy efficiency. Similarly, adjusting the load settings to the antenna can also adversely affect the energy efficiency of the system. Therefore, radio coexistence events can cause a trade-off between a poor user experience caused by various radio interference losses in the transmissions of the RF components on the one side and the reduced energy efficiency on the other.

The present solution addresses these issues by adjusting configuration settings to the aggressor and/or victim RF circuits so as to maintain the radio coexistence loss between these components within an acceptable threshold. At the same time, the present solution can improve the energy efficiency by operating the PAs at the normal operating mode when the interference loss is below the acceptable threshold for the interference. For example, the present solution can include a system on chip (SoC) that can access or utilize a lookup table that can include a plurality of configuration settings for the PAs and antennas of the aggressor and victim RF circuits. The SoC can utilize the lookup table to adjust the operation of the RF components so that their coexistence loss remains within an acceptable range, while their power consumption is minimized. This can be accomplished by categorizing conditions of the RF circuits as entries in the lookup table that can correspond to states of the RF components. The states of the RF components can be further related to sets of mitigation adjustments (e.g., RF circuit configurations) that can be assigned scores. As some mitigation actions may not be available/suitable/effective at all times, due to other system commitments or factors, the SoC can test and/or select mitigation adjustments that are associated with the highest available scores. Once a set of mitigation actions is selected, the PAs, tuners and/or the antennas of the RF components can be configured accordingly, keeping coexistence loss within an acceptable threshold and minimizing the power consumption of the system.

Although various embodiments disclosed herein are provided with respect to wearable devices, principles disclosed herein can be applied to other handheld devices (e.g., smart phones, tablet computers, laptops, etc.).

FIG. 1 is a block diagram of an example system 100. In some embodiments, the system 100 includes a communication device 120, a wearable device 110, and a wearable device 150. The wearable device 110 may be a smart watch, and the wearable device 150 may be a head wearable device (HWD) 150. The communication device 120 may be an access point or any other communication device. The HWD 150 may be referred to as, include, or be part of a head mounted display (HMD), head mounted device (HMD), head worn display (HWD) or head worn device (HWD). The wearable device 110 and the HWD 150 may communicate with each other through a communication link 114. The wearable device 110 and the communication device 120 may communicate with each other through a communication link 116, and the wearable device 150 and the communication device 120 may communicate with each other through a communication link 118. Through the wireless links 116, 118, the wearable devices 110, 150 may access content (e.g., text, image, audio, video, etc.) from other devices. The communication links 114, 116, 118 may be wireless links (e.g., cellular link, Wi-Fi link, Bluetooth link, 60 GHz link, ultra wideband link, etc.). The communication links 114, 116, 118 may be based on the same protocol or different protocols. For example, the communication links 116, 118 may conform to the 3G, 4G, 5G, LTE, 60 GHz protocol, where the communication link 114 may conform to the Wi-Fi link, Bluetooth, etc. In some embodiments, the system 100 includes more, fewer, or different components than shown in FIG. 1.

In one aspect, the wearable device 110 and the wearable device 150 may operate together to provide/support artificial reality for a user. In one example, the wearable device 150 may detect a location and an orientation of the wearable device 150, and generate a sensor measurement indicating the detected location and orientation of the wearable device 150. The wearable device 150 may transmit the sensor measurement to the wearable device 110 through the communication link 114. The wearable device 110 may receive the sensor measurement, and may generate or determine a view of the artificial reality corresponding to the detected location and orientation of the wearable device 150. The wearable device 110 may generate image data of the determined view of the artificial reality, and transmit the image data to the wearable device 150 through the communication link 114. The HWD 150 may receive the image data, and can present an image of the artificial reality to a user according to the image data. In one aspect, the process of detecting the location and the orientation of the HWD 150, and rendering the image to the user should be performed within a frame time (e.g., 11 ms or 16 ms). Any latency between a movement of the user wearing the HWD and an image displayed corresponding to the user movement can cause judder, which may result in motion sickness and can degrade the user experience.

Figure 2:
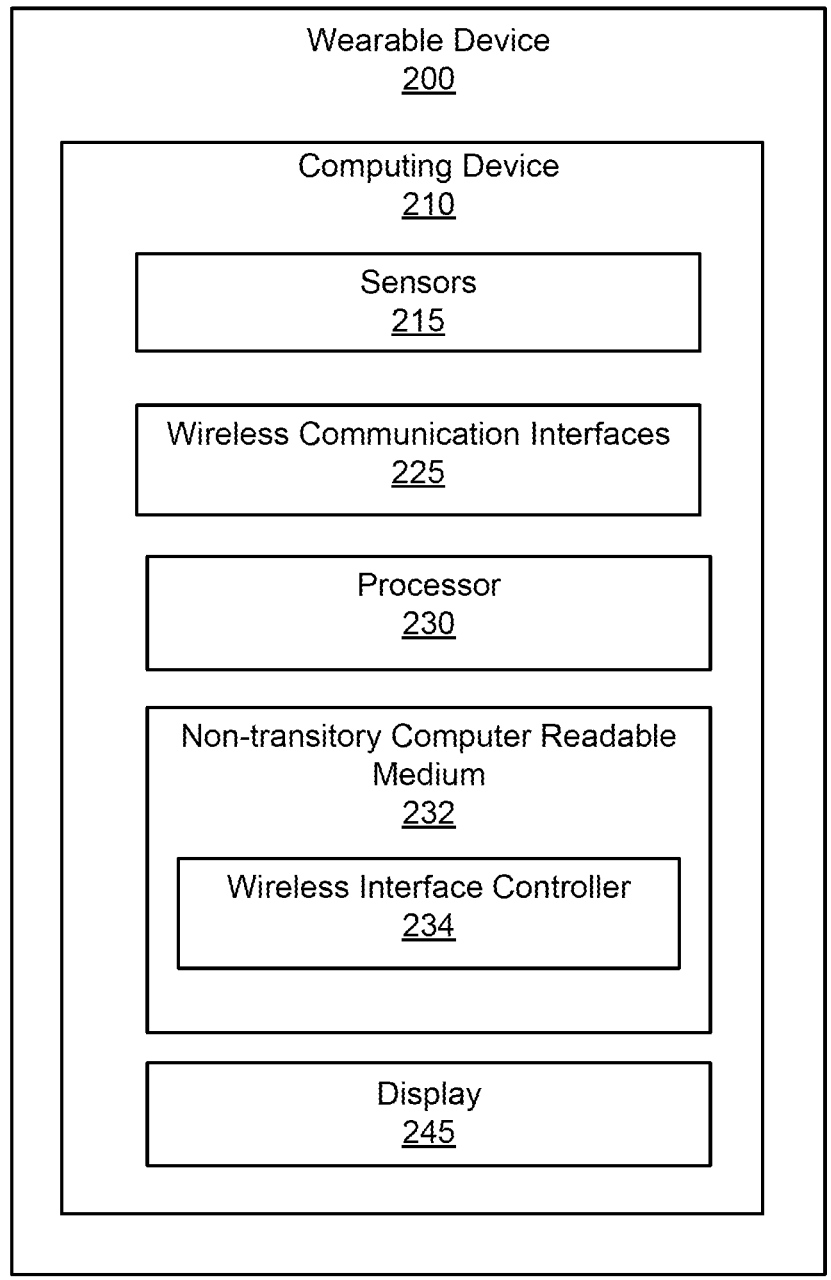
FIG. 2 is a diagram of a wearable device, according to an example implementation of the present disclosure.

FIG. 2 is a diagram of a wearable device 200, according to an example implementation of the present disclosure. In some embodiments, the wearable device 200 may be the wearable device 110 or the wearable device 150. In some embodiments, the wearable device 200 includes a computing device 210 and a cradle (not shown in FIG. 2), to which the computing device 210 can be selectively attached. In some embodiments, the computing device 210 includes sensors 215, wireless communication interfaces 225 (also referred to as "wireless interfaces 225" herein), processor 230, non-transitory computer readable medium 232, and a display 245. These components may operate together to communicate with another device, and generate or render content (e.g., artificial reality content). In other embodiments, the wearable device 200 includes more, fewer, or different components than shown in FIG. 2.

In some embodiments, the sensors 215 include electronic components or a combination of electronic components and software components that detect a proximity of a user wearing the wearable device 200. For example, the sensors 215 can include a hall sensor that can detect whether the user is proximate (e.g., less than 10 mm) to the sensor or whether the user is contacting the computing device 210 (e.g., contacting and/or blocking a certain component of the device used/configured for wireless communication). The sensors 215 may detect a proximity of the user with respect to the computing device 210, and can generate a sensor measurement data indicating the detected proximity.

In some embodiments, the sensors 215 include electronic components or a combination of electronic components and software components that can operate to sense/determine/measure a location and/or an orientation of the computing device 210. Examples of the sensors 255 can include: one or more imaging sensors, one or more accelerometers, one or more gyroscopes, one or more magnetometers, or any other suitable type of sensor(s) that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 215 detect the translational movement and the rotational movement, and determine an orientation and location of the computing device 210. The sensors 215 may generate sensor measurements indicating the detected location and orientation of the computing device 210.

In some embodiments, wireless communication interfaces 225 include electronic components or combinations of electronic components and software components that communicate with another device through wireless communication links (e.g., communication link 114, 116, 118). In some embodiments, the wireless communication interfaces 225 include a wireless interface for a cellular communication link (e.g., 3G, 4G, LTE communication link). The wireless communication interfaces 225 may also include a wireless interface for a different communication link (e.g., Wi-Fi or Bluetooth communication link). In some embodiments, wireless communication interfaces 225 include or are embodied as transceivers or communication modems coupled to the transceivers for transmitting and receiving data through wireless mediums. The wireless communication interfaces 225 may transmit or receive sensor measurement data indicating locations and orientations of the computing device 210. Moreover, the wireless communication interface 225 may transmit or receive image data indicating or corresponding to images to be rendered.

In some embodiments, the processor 230 includes an electronic component or a combination of an electronic component that can execute instructions stored by the non-transitory computer readable medium 232. The processor 230 may include one or more central processing units (CPUs), graphical processing units (GPUs) or a combination of them. The non-transitory computer readable medium 232 may store instructions for executing one or more applications executable by the processor 230.

One example application when executed by the processor 230 may cause the processor 230 to generate or process content for rendering. The processor 230 executing the application may cause the processor 230 to generate image data for rendering, according to sensor measurement data from the sensors 215 or the wireless communication interfaces 225. For example, the processor 230 executing the application may determine a view of the artificial reality corresponding to detected location and orientation in the sensor measurement data and generate image data of the determined view of the artificial reality.

Example applications when executed by the processor 230 may cause the processor 230 to control or adjust the wireless communication interface 225. Example applications include wireless interface controller 234. The wireless interface controller 234 may be executed by the processor 230 to detect whether the computing device 210 is attached to a cradle. In response to determining that the computing device 210 is detached from the cradle, the processor 230 executing the wireless interface controller 234 may determine whether the contact of the user with the computing device 210 interferes with the wireless communication link or not. In response to determining that the contact of the user with the computing device 210 interferes with the wireless communication link, the processor 230 executing the wireless interface controller 234 may initiate a process to facilitate communication of the data.

In one aspect, the processor 230 receives a sensor measurement indicating whether the computing device 210 is attached to or detached from a cradle. For example, the sensor 215 includes a hall sensor or any electrical sensor that can generate a sensor measurement indicating whether the computing device 210 is attached to or detached from a cradle. According to the sensor measurement, the processor 230 may determine whether a user contact with the computing device 210 degrades the signal quality of the wireless communication link or not. For example, in response to the sensor measurement indicating that the computing device 210 is attached to the cradle, the processor 230 may determine whether the user contact with the computing device 210 degrades the signal quality of the wireless communication link or not. For example, in response to the sensor measurement indicating that the computing device 210 is not detached from the cradle, the processor 230 may bypass or skip determining whether the user contact with the computing device 210 degrades the signal quality of the wireless communication link or not.

In one approach, the processor 230 may determine whether a user contact with the computing device 210 degrades the signal quality of the wireless communication link or not, according to a receive signal metric of the wireless communication interface 225. An example receive signal metric includes reference signals received power (RSRP), reference signal received quality (RSRQ), etc. To determine whether the user contact with the computing device 210 degrades the signal quality of the wireless communication link or not, the processor 230 may compare a first receive signal metric of the wireless communication link at a first time and a second receive signal metric of the wireless communication link at a second time after the first time. For example, in response to determining that the second receive signal metric is worse or lower than the first receive signal metric by an amount larger than a threshold amount, the processor 230 may determine that the user contact with the computing device 210 degrades the signal quality of the wireless communication link. The threshold amount may be adjustable or reconfigurable. In response to determining that the second receive signal metric is worse or lower than the first receive signal metric by an amount less than the threshold amount (e.g., within a defined time period, which may include the first time and the second time), the processor 230 may determine that the user contact with the computing device 210 does not degrade the signal quality of the wireless communication link.

In one approach, the processor 230 may determine whether a second wireless communication link degrades the signal quality of the first wireless communication link or not, according to an uplink transmit power level of the wireless communication interface 225. For example, the processor 230 may determine that the second simultaneously operating wireless communication link degrades or reduces the signal quality of the first wireless communication link, in response to an uplink transmit power of the wireless interface reaching or exceeding a defined transmit power level. The processor 230 may determine that the second wireless communication link degrades the signal quality of the first wireless communication link, in response to i) determining that the second receive signal metric is worse or lower than the first receive signal metric by an amount larger than the threshold amount, and ii) determining that the uplink transmit power of the wireless interface reaches or exceeds a defined transmit power level. Based on the sudden drop in the receive signal metric (e.g., according to the defined time period, and/or the first time and the second time), an increased transmit power level, and/or the computing device 210 being detached from the cradle, the processor 230 may infer or determine with a high accuracy/certainty that the simultaneous operation of the second wireless communication link has degraded the signal quality of the first wireless communication link.

In one approach, the processor 230 may determine whether simultaneous operation of the second wireless communication link degrades the signal quality of the first wireless communication link or not, according to a user equipment measurement reporting event. The user equipment measurement reporting event may be a reporting event for cellular protocols (e.g., LTE, etc.). For example, the processor 230 may determine that the simultaneous operation of the second wireless communication link degrades the signal quality of the first wireless communication link, in response to detecting an A2 event (serving becomes worse than threshold). The processor 230 may determine that the simultaneous operation of the second wireless communication link degrades the signal quality of the first wireless communication link, in response to i) determining that the second receive signal metric is worse or lower than the first receive signal metric by an amount larger than the threshold amount, and/or ii) detecting the A2 event. Based on the sudden drop in the receive signal metric, detecting the A2 event, and/or the computing device 210 being detached from the cradle, the processor 230 may infer or determine that simultaneous operation of the second wireless communication link has degraded the signal quality of the first wireless communication link, with a high accuracy/certainty.

In some embodiments, the display 245 is an electronic component that displays an image. The display 245 may, for example, be a liquid crystal display or an organic light emitting diode display. The display 245 may be a touch screen display. The display 245 may be a transparent display that allows the user to see through. In some embodiments, the display 245 may, in response to determining a loss caused by a second wireless communication signal, prompt the user to perform an action to improve signal quality. Such actions may include ending one of the plurality of simultaneous wireless communication signals (i.e., no longer using WiFi), giving permission to increase power consumption of the device 200 or its components, or another action to mitigate the interference.

Figure 3:
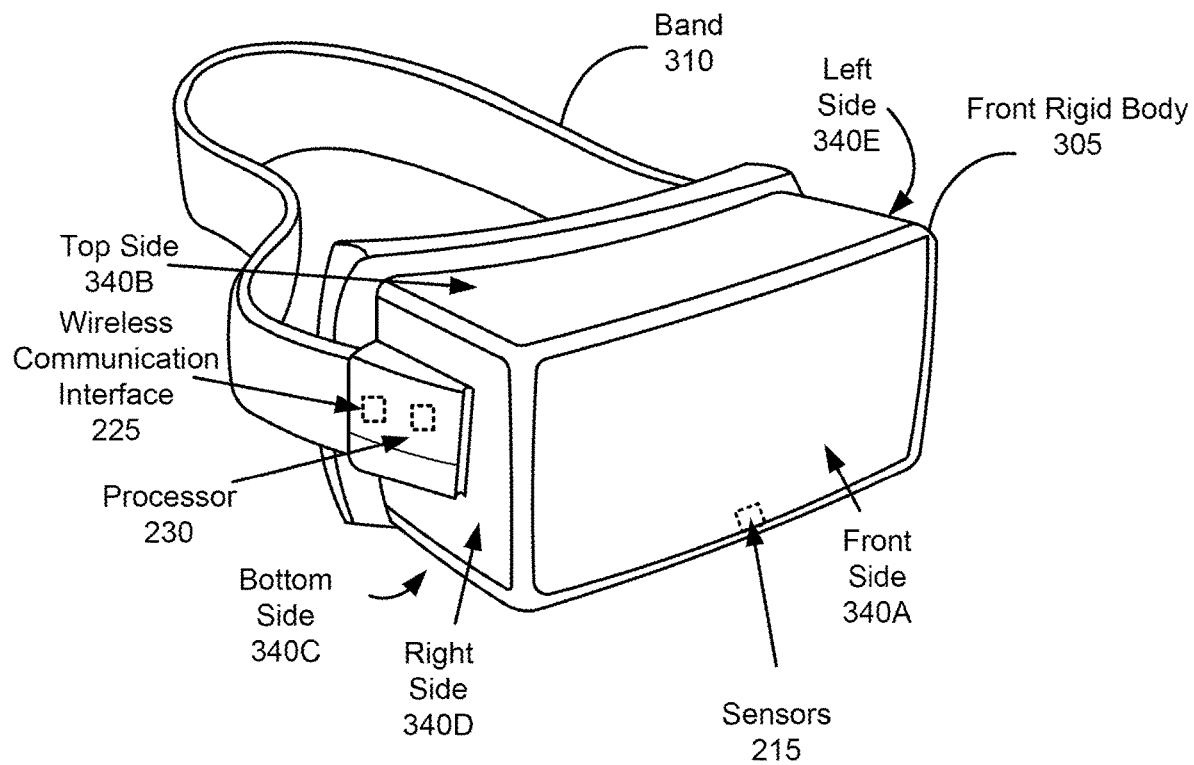
FIG. 3 is a diagram showing a perspective view of a head wearable display, according to an example implementation of the present disclosure.

FIG. 3 is a diagram of the HWD 150, in accordance with an example embodiment. In some embodiments, the HWD 150 includes a front rigid body 305 and a band 310. The front rigid body 305 includes the display 245 (not shown in FIG. 3), lens (not shown in FIG. 3), the sensors 215, the wireless communication interface 225, and the processor 230. In the embodiment shown by FIG. 3, the wireless communication interface 225, the processor 230, and the sensors 215 are located within the front rigid body 305, and may not be visible to the user. In other embodiments, the HWD 150 has a different configuration than shown in FIG. 3. For example, the wireless communication interface 225, the processor 230, and/or the sensors 215 may be in different locations than shown in FIG. 3, including for example front side 340A, bottom side 340C, right side 340D or left side 340E.

Figure 4:
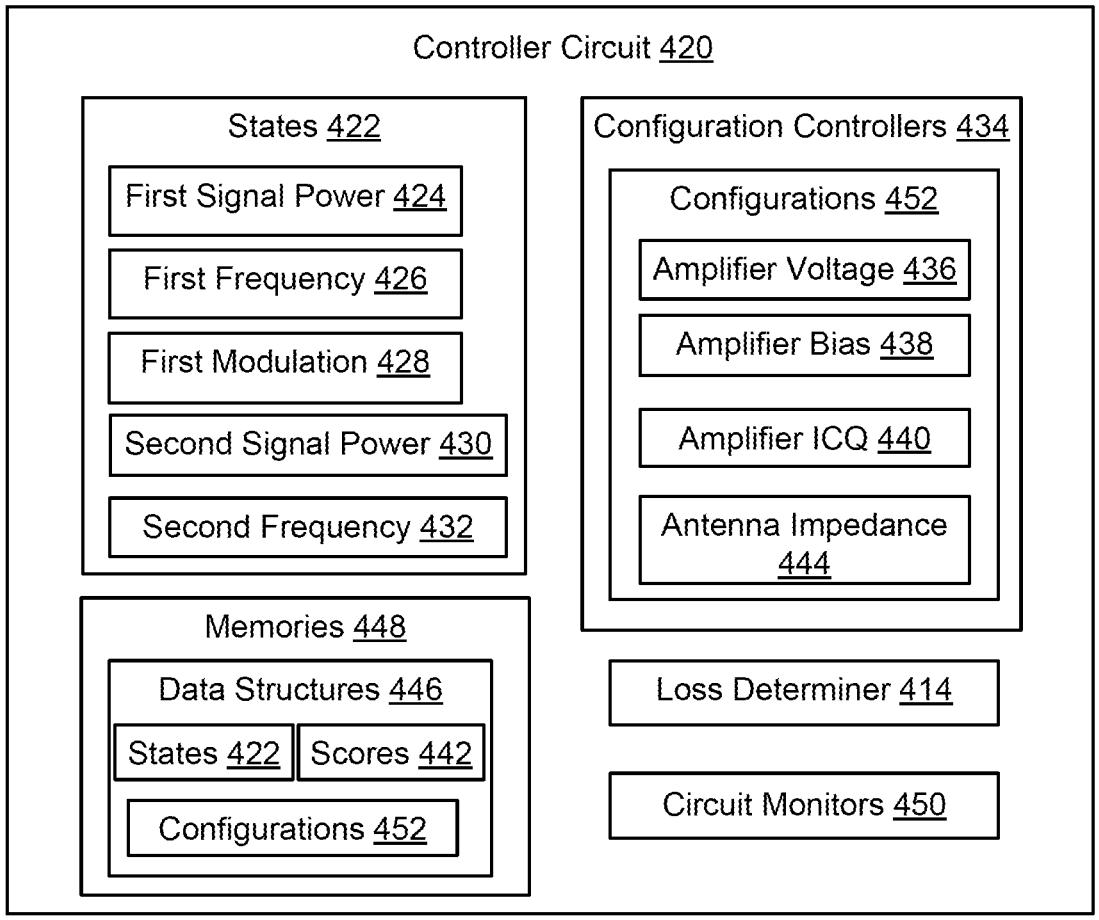
FIG. 4 is a diagram of a system for reducing wireless signal interference, according to an example implementation of the present disclosure.

FIG. 4 is a diagram of a system 400 for reducing interference caused by radio coexistence between RF circuits, in accordance with an example embodiment. The system 400 can include a first circuit 402, a second circuit 410 and a controller circuit 420. The first circuit can include a wireless communication protocol 404, antenna 406 and/or power amplifier 408. The second circuit 410 can include a wireless communication protocol 412, loss determiner 414, power amplifier 416 and/or antenna 418. The control circuit 420 can include states 422, memories 448, configuration controllers 434, loss determiner 414 and/or circuit monitors 450. States 422 can include states on first signal power 424, first frequency 426, first modulation 428, second signal power 430 and/or second frequency 432. Memories 448 can include data structures 446 that can store states 422, scores 442 and/or configurations 452. Configuration controllers 434 can include configurations 452 that can include amplifier voltage 436, amplifier bias 438, amplifier ICQ 440 and/or antenna impedance 444.

At a high level, system 400 can reduce the wireless signal interference between the first circuit 402 and the second circuit 410. The first and second circuits (e.g., 402 and 410) can send or receive their wireless signals via their wireless communication protocols (e.g., 404 and 412), and the wireless signals can be received or transmitted via the antennas (e.g., 406 or 418) and amplifiers (e.g., 408 or 416). The first circuit 402 can be referred to as the aggressor as it causes a loss in the signal in the second circuit 410 in which it causes interference. The second circuit 410 in this example can be referred to as the victim circuit. Controller circuit 420 can monitor the first and second circuits 402 and 410 using the circuit monitor 450. A loss determiner 414 can be used either by the victim circuit (e.g., 410) or the controller circuit 420 to determine the loss experienced by the victim circuit 410 due to the radio coexistence interference with the signal from the first circuit 402. To reduce the interference, the controller circuit 420 can identify matching states 422 in the data structure 446 (e.g., lookup table) with the current state of operation of the first and second circuits 402 and 410 (e.g., the current settings of the circuits 402 and 410). By identifying the state 422 that reflects the states of the operation of the first and second circuits 402 and 410, the controller circuit can identify one or more configurations 452 that correspond to the identified state 422. Using the one or more identified configurations 452 or the states 422, the controller circuit 420 can identify a specific configuration 452 (e.g., corresponding to the highest available score 442). In the event that the selected configuration 452 (e.g., corresponding to the highest score 442 in the data structure 446) is not available or suitable, the controller circuit 420 can identify another configuration 452 (e.g., that has the next highest score 442) and check whether that configuration 452 is available or suitable (e.g., can be applied). Utilizing the configuration controller 434, the controller circuit 420 can implement the identified configurations 452 corresponding to the highest available scores 442 for instance, to reduce the interference loss and improve the communication of the first and second circuits 402 and 410. As some configurations 452 used to reduce interference loss can operate amplifiers 408 and 416 at higher energy consumption (e.g., higher linearity), in the instances in which the first and second circuits 402 and 410 do not experience interference the control circuit 420 can operate the amplifiers 408 and 416 at lower energy consumption configurations.

The circuits 402 and 410 can include any circuitry of a system 150, a wearable device 110, 120 or 200, any communication device 120, or any other device or system discussed herein. Circuits 402 or 410 can include any combination of hardware and software that can emit wireless signals, including wireless communication signals or data. The circuits 402 and 410 can include embedded chips, printed circuit boards (PCB), or another type of circuit boards. The circuits 402 and 410 can be located on the wearable device 110 or 150. The circuits 402 and 410 can contain sensors, power sources, and/or embedded chips.

The circuits 402 and 410 can each support or operate at a respective wireless communication protocol 404 and 412. Wireless communication protocols 404 and 412 on the first and second devices 402 and 410 can be the same wireless communication protocol or different wireless communication protocols. Wireless communication protocols 404 and 412 can include, for example, any one or more of a plurality of wireless protocols, including Bluetooth, WiFi, cellular data signals (e.g., 4G or 5G) or any other wireless communication protocols. The wireless communication protocols 404 and 412 can at least be used to communicate with each other, with the circuits 402 and 410, with other circuits, with other components of the devices 110 or 150, or with outside devices. The wireless communication protocols 404 and 412 can simultaneously operate.

The circuits 402 and 410 can include an antenna or plurality of antennas 406 and 418, respectively. The antenna(s) 406 and 418 can be used to transmit or receive signals of the wireless communication protocols 404 and 412. The antenna(s) 406 and 418 can be tuned according to at least their impedance, directivity, electromagnetic polarization, and/or frequency response. The antenna(s) 406 and 418 can be configured to operate in a plurality of bandwidths and frequencies. The antenna(s) can be one of an aperture antenna, a microstrip antenna, a wire antenna, or a lens antenna.

The circuits 402 and 410 can include power amplifiers 408 and 416, respectively. Power amplifiers (PA) 408 and 416 can be used to amplify or reduce the signal of the communication protocols 404 and 412 through antennas 406 and 418. PA 408 or 416 can increase the signal-to-noise ratio (SNR) of transmitted signals. PA 408 or 416 can have characteristics modified. These modifiable characteristics can include the supply power, bias, or collector current varying from its Q-point (ICQ). PA 408 or 416 can be of any class, where class refers to the identity of the amplifier's performance and characteristics, as known to those in the art.

Power amplifiers 405 and 416 can operate in different modes. For example, power amplifiers 405 and 416 can operate at a high linearity mode. A PA 405 or 416 operating at a high linearity mode can include a bias voltage or a bias current allowing the PA 405 or 416 to operate at linear range. PA 405 or 416 can operate a normal mode, such as a mode without a bias voltage or a bias current. The normal mode of operation can consume less power or energy than the high linearity mode of operation.

Control circuit 420 can include any device, circuit, controller, processor or a system that can manage or control the circuits 402 and 410. Control circuit 420 can include any combination of hardware and software for controlling wireless communication systems or devices, including controlling wireless signals transmitted by the circuits by adjusting the power amplifiers and/or impedances of antennas. Control circuit 420 can exist as a standalone circuit, or can be included within or be in communication or in conjunction with, any of the circuits 402 or 410. Control circuit 420 can exist physically reside within the device 200, or can exist as a remote device, such as a remote controller or separate wearable device. Control circuit can include a plurality of processors, sensors, memories, or data structures to control aspects of the device 200.

Control circuit can change operating parameters of the circuits 402 and 410 in response to stimuli. As an example, control circuit 420 can change operating parameters of the antenna 406 in response to the loss determiner 414 detecting a loss greater than a determined threshold. As an example, control circuit 420 can change the operation of the wireless communication protocol 404 in response to a user input. Control circuit 420 can compare the state or operation of the circuits 402 and/or 410 against states 422 that can be stored in a data structure 422. Control circuit 420 can use a plurality of states 422 to determine, via a configuration controller 434, in conjunction with a data structure 446, memory 448, circuit monitor 450, scores 442 and the loss determiner 414, one or more configurations 452 to apply to circuits 402 and/or 410. For example, control circuit 420 can compare operation or state of the circuits 402 or 410 to identify a state 422 matching the circuits 402 or 410 in order to adjust configurations 452 of the circuits 402 and 410. As an example, control circuit 420 can take as input at least a particular state 422 from the plurality of state 422, and can apply to the circuits 402 and 410, via configuration controller 434, particular configurations 452 (e.g., any combination of: amplifier voltage 436, amplifier bias 438, amplifier ICQ 440 or antenna impedance 444) to modify operation of circuits 402 and 410 to reduce the interference between a predetermine threshold level.

State 422 can comprise a plurality of states of the system 400 that can be defined by any combination of amplifier voltage 436, amplifier bias 438, amplifier ICQ and/or antenna impedance 444. The states 422 can include a first signal power 424, a first frequency 426, a first modulation 428, a second signal power 430, and/or a second frequency 432. A state 422 can be indicative of a characteristic of the signal operation of the system, including the operation of wireless communication protocols 404 and 412. The state 422 can be stored in memory 448 or a data structure 446, such as a lookup table. The state 422 can be encoded in memory via code on the device 200, or stored in an external device 200. The state 422 can be periodically updated. For example, the state 422 can be updated in response to a predetermined time, a change reported by the loss determiner 414 or the circuit monitor 450, or by a user input. The state 422 can be reported on by circuit monitor 450.

State 422 can include any one or more of different states 422, including any combination of any one or more of: a first signal power 424, a first signal frequency 426, a first modulation 428, a second signal power 430 and a second signal frequency 432. For example, a state 422 can be a first signal power 424, also referred to as FSP 424. First signal power 424 can refer to the power consumption of the first circuit 402. First signal power 424 can refer to the power or energy level of the wireless signal transmitted or received by the first circuit 420. First signal power 424 can be monitored via circuit monitor 450, and can encompass a variety of signals detected by sensors 215, such as potential sensors and current sensors.

A state 422 can include a first frequency 426, also referred to as FF 426. First frequency 426 can refer to the frequency of the wireless signal emitted or received by first circuit 402. The state 422 relating to the first frequency 426 can be monitored via circuit monitor 450, and can encompass a variety of signals detected by sensors 215 such as frequency sensors, permittivity sensors, and magnetometers.

A state 422 can include a first modulation 428, also referred to as FM 428. First modulation 428 can refer to any characteristic of the data signal superimposed upon the carrier signal. First modulation 428 can include the frequency or wavelength of the data or carrier signal or the SNR of the data signal compared to the carrier.

A state 422 can include a second signal power 430, also referred to as SSP 430. Second signal power 430 can refer to the power consumption of the second circuit 410. Second signal power 430 can refer to the power or energy of the wireless signal transmitted or received by the second circuit 410. Second signal power 430 can be monitored via circuit monitor 450, and can encompass a variety of sensors 215 such as potential sensors and current sensors.

A state 422 can include a second frequency 432, also referred to as SF 432. Second frequency 432 can refer to the frequency of the signal transmitted or received by second circuit 410. This state can be monitored via circuit monitor 450, and can encompass a variety of sensors 215 such as frequency sensors, permittivity sensors, and magnetometers.

Second circuit 410 can include a loss determiner 414. The loss determiner 414 can be any combination of hardware and software for detecting, measuring, or otherwise determining the loss (e.g., signal loss) due to an interference of a wireless signals of the first and second circuits 402 and 410. The loss determiner 414 can be configured to evaluate a loss or change in the signal of the wireless communication protocol 412 as a result of interference from the signal of the wireless communication protocol 404. A loss or change in the signal of the wireless communication protocol 412 can include, for example, a reduction in SNR, attenuation, or introduction of harmonics. The loss determiner 414 can operate by comparing an expected signal to an actual signal of wireless communication protocol 412. Other example methods of operation for loss determiner 414 include comparison of signal power, voltage, or frequency. Data from the loss determiner 414 can be stored in the one or more processors, or accessed by the control circuit 420.

The table below can be used in conjunction with loss determiner 414. For example, loss determiner 414 can determine a variety of scenarios, including radio operation concurrent with no coexistence loss, radio operation concurrent with a coexistence loss, or non-concurrent radio operation. The loss determiner can determine the scenario responsive to a determination of the operations of the aggressor radio (e.g. wireless communication protocol 404) and the victim radio (e.g. wireless communication protocol 412). The example tables below are not limiting and can be extended to include different and more scenarios.

TABLE 1 shows different loss occurrence scenarios.

| Scenario | Aggressor radio | Victim radio |
|---|---|---|
| Non concurrency | OFF | ON |
| Concurrency, no coexistence loss | ON | ON, no coexistence loss or coexistence loss within tolerance range |
| Concurrency coexistence loss | ON | ON, desensed |

The table 1 shown above can also be extended to a lookup table with more specified range of the radio sensitivity with aggressor and victim radio configurations, such as shown in Table 2 below:

TABLE 2 shows loss occurrence scenarios with aggressor and victim circuit configurations.

| Scenario | Aggressor radio configuration | Victim radio configuration |
|---|---|---|
| Non concurrency | OFF | ON |
| Case 1 | MCS Aa/Power level Aa | ON, MCS Va/Desense amount Va |
| Case 2 | MCS Ab-Power level Ab | ON, MCS Vb/Desense amount Vb |
| ... | ... | ... |
| Case n | MCS An/Power level An | ON, MCS Vn/Desense amount Vn |

In the example above, the aggressor radio (e.g., of first circuit 402) transmitter can be pre-configured with different configurations 452 to maintain the loss within an acceptable threshold level.

Circuit monitor 450 can provide information about the circuits 402 and 410 and their subcomponents. Circuit monitor 450 can monitor through sensors, signal communications, or other means as described above in conjunction with wireless communication protocols 303 and 412, antennas 406 and 418, power amplifier 408 and 416, and/or loss determiner 414. Circuit monitor 450 can exist in pluralities. Circuit monitor 450 can take a plurality of inputs, such as current, power and wavelength, as examples. Circuit monitor 450 can report on errors within the circuits 402 and 410. Circuit monitor 420 can work in conjunction with state 422 to update a state based on readings from the circuit monitor 420 and to report these changes to the configuration controller 434.

For example, a circuit monitor 450 can monitor the state of operation of the circuits 402 and 410. In particular, the circuit monitor can monitor Frequency (AF) (e.g., first frequency 426), MCS (e.g., first modulation 428), Tx Power Level (AP) (e.g., first signal power 424), Frequency (VF) (e.g., second frequency 432), or Rx Power Level (VP) (e.g., second signal power 430). In response to a loss determined in the second circuit 410 by the loss determiner 414, the configuration controllers 434 can modify through mitigation actions (e.g., configurations 452). Configurations can be Mitigation Actions below, including Vcc (MV) (e.g., amplifier voltage 436), Bias (MB) (e.g. amplifier bias 438), ICQ (MI) (e.g., amplifier ICQ 440), or tuner code (MT) (e.g., antenna impedance 444).

The following tables can include example parameters (e.g., states 422) that the system 400 can monitor. The parameters (e.g., states 422) corresponding to the aggressor (e.g., first circuit 402) and/or the victim (e.g., second circuit 410) can be used to identify, via a data structure 446 (e.g., a lookup table) one or more of the corresponding mitigation actions (e.g., configuration 452) that can be applied to any combination of the first and second circuits 402 and 410 to reduce the interference losses.

TABLE 3 shows states 422 (e.g., lookup conditions) of the aggressor (first) and/or victim (second) circuits along with configurations 452 (e.g., changes that can be applied to adjust loss).

| States 422 (lookup conditions) | | Configurations 452 | |
|---|---|---|---|
| First Signal Power 424 | Second Signal Power 430 | Amplifier Voltage 436 | |
| First Frequency 426 | Second Frequency 432 | Amplifier Bias 438 | |

TABLE 3-continued shows states 422 (e.g., lookup conditions) of the aggressor (first) and/or victim (second) circuits along with configurations 452 (e.g., changes that can be applied to adjust loss).

| States 422 (lookup conditions) | Configurations 452 |
|---|---|
| First Modulation 428 | Amplifier ICQ 440 |
| | Antenna Impedance 444 |

Configuration controller 434 can encompass/perform methods for adjusting circuits 402 and 410 such as configurations 434 or data structure 446. Configuration controller 434 can modify these and other aspects of the circuits in response to memory 448, state 422, circuit monitors 450, scores 442 and/or loss determiner 414. In an example, configuration controller 434 can receive input from loss determiner 414 that the linearity of the signal form wireless communication protocol 412 is below a certain score 442 stored in data structure 446, and is therefore in a specific state outlined in state 422. Configuration controller 434 can, as a result of this information alter one or more characteristics of the configurations 434 (such as amplifier voltage 436 or amplifier bias 438) to be within the desired threshold. For example, if the state 422 and circuit monitor 450 indicate only one of wireless communication protocol 404 and 412 is operating, the controller circuit 420 can instruct the configuration controller 434 to operate the amplifier voltage 436 in a low voltage mode, in order to conserve energy when high linearity is not necessary. In an example, if the state 422, loss determiner 414 and/or circuit monitor 450 indicate that the signal from wireless communication protocol 412 is not as expected, based on the score 422 in a data structure 446, the controller circuit 420 can instruct the configuration controller 434 to alter the amplifier ICQ 440 to maintain a desired threshold.

Data structure 446 can be organized in any number of ways to include states 422, configurations 452 and scores 442. For example, a data structure 446 can include or utilize a table, such as a lookup table. The lookup table can include rows and columns organized to group or identify the configurations 452 and scores 442 that correspond to a particular state 422. For example, data structure 446 can include a lookup table, such as the one shown the table 4 below.

mode. The normal mode can include operating the power amplifier without a bias or at least in part, a non-linear range.

The configuration controller 434 can include a plurality of configurations 452. These configurations 452 can be a variety of mitigation actions such as altering the amplifier voltage 436, amplifier bias 438, amplifier ICQ 440, or antenna impedance 444. Amplifier voltage 436 can refer to the supplied voltage to any of the power amplifiers 408 or 416. Modification of the amplifier voltage 436 can result in a change in the power consumption of the device 200 and/or in the signal performance of wireless communication protocols 404 or 412.

Amplifier bias 438 can refer to a configuration or setting of the initial operating characteristics (such as current and voltage) of the power amplifiers 408 and 416. Modification of the amplifier bias 438 can result in a change in the power consumption of the device 200 or in the signal performance of wireless communication protocols 404 or 412.

Amplifier ICQ 440 can refer to a configuration or a setting to the collector current at a bias point. Amplifier ICQ 440 can be the current necessary to operate the transistors of the amplifier at the quiescent operating point. Modification of the ICQ 440 can result in improvement of the distortion of the amplifier 408 or 416.

Antenna impedance 444 can refer to a configuration or a setting to the impedance at the input terminals of an antenna, such as antennas 406 and 418. Modification of the antenna impedance 444 can result in changes to the signal quality and/or the power consumption of the device.

Data structure 446 can include any arrangement of data or information. Data structure 446 can include any type of a chart, a look up table, a list, a graph, a file or any arrangement of data that can be used to organize stored information. Information stored can include any score 442, any state 422, any configurations 452 and/or any scores 442. The data structure 446 can be stored in memory 448 and can be accessed by controller circuit 420. Data structure 446 can be accessed to adjust configurations 452 for the first and second circuit 402 and 410.

Scores 442 can include any rank, quantity, threshold or value corresponding to a quality or preference of any one of states 422 or configurations 452. A score 442 can include a value corresponding to quality or preference of a configu-

TABLE 4 shows a lookup table with states 422 (e.g., lookup conditions) that can be used to identify configurations 452 that can be applied to the circuits to adjust loss according to scores.

| Case | State 422 (lookup conditions) | Configurations 452 | Score 442 |
|---|---|---|---|
| 1 | (FSP 424, FF 426, FM 428, SSP 430, SF 432) | (AV 436, AB 438, A ICQ 440, AI 444) | Score 1.1 |
| 1 | (FSP 424, FF 426, FM 428, SSP 430, SF 432) | (AV 436, AB 438, A ICQ 440, AI 444) | Score 1.2 |
| 1 | (FSP 424, FF 426, FM 428, SSP 430, SF 432) | (AV 436, AB 438, A ICQ 440, AI 444) | Score 1.3 |
| 2 | (FSP 424, FF 426, FM 428, SSP 430, SF 432) | (AV 436, AB 438, A ICQ 440, AI 444) | Score 2 |
| . . . | . . . | . . . | . . . |
| N | (FSP 424, FF 426, FM 428, SSP 430, SF 432) | (AV 436, AB 438, A ICQ 440, AI 444) | Score N |

Configuration controller 434 can configure power amplifiers 416 on circuits 402 or 410 to operate at various modes of operation. For example, configuration controller 434 can configure a power amplifier 408 or 416 of first circuit 402 or second circuit 410 to operate at a high linearity mode. The high linearity mode of power amplifier operation can involve, for example, operating at the linear range. The high linearity mode can involve higher power consumption of the device. For example, configuration controller 434 can configure a power amplifier 408 or 416 to operate at a normal ration 452 defined by any combination of FSP 424, FF 426, FM 428, SSP 430 or SF 432 for a particular state 422 that can be defined by any combination of AV 436, AB 438, A ICQ 440 or AI 444. Score 442 can be stored within the data structure 446 within a memory 448.

Memory 448 can include a solid state drive, a cloud, memory chip, physical or remote memory. Memory 448 can be used to store information pertaining to controller circuit 420, first circuit 402, or second circuit 410. Memory 448 can store information about characteristics of signals like wireless communication protocol 404 or 412. Memory 448 can be accessed by controller circuit 420 at any time, or responsive to a stimuli such as a scheduled software interrupt or a change indicated by loss determiner 414.

Figure 5:
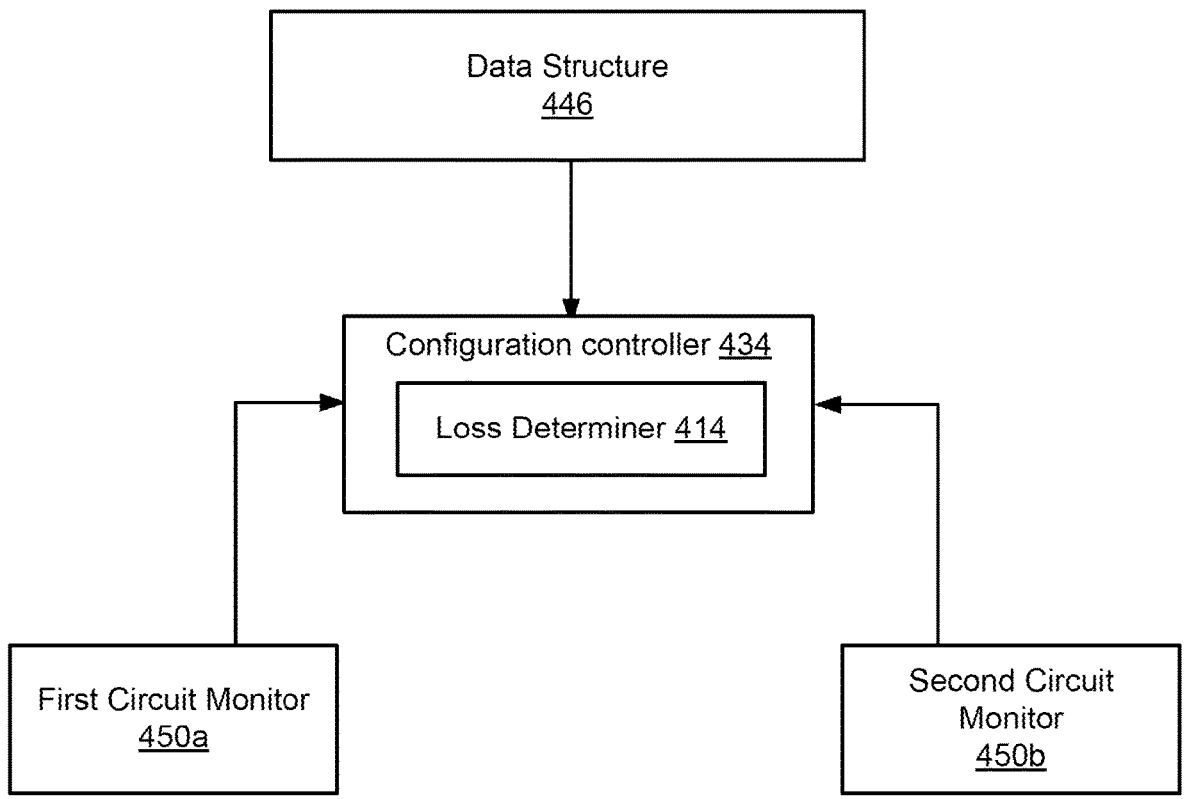
FIG. 5 is a diagram of a system for reducing wireless signal interference, according to another example implementation of the present disclosure.

FIG. 5 illustrates an example system 500 in which an example embodiment for operating a configuration controller 434 to minimize interference loss uses a loss determiner 414 monitoring operation of the first and second circuits 402 and 410 via first circuit monitor 450*a* and second circuit monitor 450*b*. System 500 can include a configuration controller 434 which can choose a configuration (e.g., of configurations 452) responsive to a plurality of inputs. For instance, a configuration controller 434 can be a control circuit and can include any variety of circuit elements such as system on chip (SoC), embedded computing chips, sensors, or system memory. Configuration controller 434 can access a plurality of configurations and apply these configurations to the system. Configuration controller 434 can apply a configuration according to the loss determiner 414.

The loss determiner 414 and configuration controller 434 can receive inputs from the circuit monitors 450*a* and 450*b*. The circuit monitors can monitor the first circuit 402, the second circuit 410, and the control circuit 420 for a change in state 422. Example changes can include an increase in the first signal power 424 or a distortion in the first frequency 426. The circuit monitors can include sensors 215 to monitor for changes. The sensors 215 can include power meters, oscilloscopes, or phase detectors, as an example. The circuit monitors can transmit these changes to the configuration controller 434 via wired or wireless communication. The data from the circuit monitors 450 can be compared to stored data in the data structure 446 by the configuration controller 434.

The data structure 446 can store a plurality of data about the system 400 or 500. Data structure 446 can, as an example, store at least information relating to the states 422, the scores 442, or the configurations 452. Data structure 446 can organize this information as a table, list, chart, or other organizational tool. Data structure 446 can relay this information to the configuration controller 434 via hardwired or wireless connection.

Loss determiner 414 can be operated by configuration controller 434 to determine if a loss in signal quality has occurred, responsive to inputs from the circuit monitors 450 and the data structure 446. Loss determiner 414 can be, for example, a SoC, a processor, or a comparator. Loss determiner 414 can compare the information received from the circuit monitors 450 to the scores 442, states 422, or configurations 452 stored in data structure 446 to determine if a signal loss has occurred. Loss determiner 414 can relay this information to configuration controller 434 via a hardwired or wireless connection. Configuration controller 434 can then operate to choose a configuration to mitigate the change in signal, or do nothing.

In some aspects, the present solution can relate to a system 400, such as one or more devices or circuits, which can include a first circuit 402, a second circuit 410 and a control circuit 420. The first circuit 402 can be configured for a first wireless communications protocol 404. The second circuit 410 can be configured for a second wireless communications protocol 412. The second circuit 410 can be configured to determine a loss caused by an interference from the first wireless communications protocol 404. For example, the second circuit 410 can use a loss determiner 414 that can determine, measure or establish a loss in decibels that is caused by interference from the first wireless communications protocol 404 from the first circuit 402. The controller circuit 420 can be configured to determine a configuration 452 for operating at least one of the first circuit 402 or the second circuit 410. The configuration 452 can include any combination of settings, commands or configurations for amplifier voltage 436, amplifier bias 438, amplifier ICQ 440, or antenna impedance 444. The determination can be made in response to the loss exceeding a defined score 442 that can be stored in a data structure 446. The determination can also be made according to a state 422 of the first circuit and the second circuit. The state 422 can include a power of a signal of the second wireless communication protocol received at the second circuit, such as second signal power 430. The state 422 can include a frequency of the first circuit, such as the first signal power 424. The state 422 can include a modulation setting of the first circuit, such as the first modulation 428. The state 422 can include a power of a signal of the first wireless communications protocol, such as first signal power 424. The state 422 can include a frequency of the second circuit, such as second frequency 432. The controller circuit 420 can be configured to apply the configuration to at least one of the first circuit 402 or the second circuit 410 to adjust the loss.

The system 400 can include the controller circuit 420 that is configured to operate an amplifier (e.g., power amplifier 408) of the first circuit 402 in a high linearity mode. For example, the high linearity mode can be a mode of operation of an amplifier whose gain is in the linear range of +0.4 dB for example. The high linearity mode of operation can be achieved by adjusting at least one of: a voltage supplied to the amplifier (e.g., amplifier voltage 436), a bias of the amplifier (e.g., amplifier bias 438) or a collector current at a bias point of the amplifier (ICQ) (e.g., amplifier ICQ 440).

The system 400 can include the controller circuit 420 that is configured to operate the amplifier (e.g., power amplifier 408) of the first circuit 402 in a normal linearity mode. The normal linearity mode can be, for example, a mode of operation of a power amplifier 408 that consumes less energy and is not limited to linear range of operation. The controller circuit 420 can operate the amplifier 408 in normal linearity mode in response to the loss being below the defined threshold or the interference not occurring. For example, a loss determiner 414 can detect that the loss or interference is below a threshold score 442, and in response to the detection, the controller circuit 420 can establish the configuration for the power amplifier 408 to operate in a normal linearity mode.

The system 400 can include the controller circuit 420 that can be configured to adjust at least one of an impedance of an antenna (e.g., antenna impedance 444) of the first circuit 402 or an impedance of an antenna of the second circuit 410. The system 400 can include the controller circuit 420 that can be configured to adjust a supply voltage of an amplifier of the first or second circuit (e.g., amplifier voltage 436), a bias of the amplifier of the first circuit (e.g., amplifier bias 438), an ICQ of the amplifier of the first circuit (e.g., amplifier ICQ 440) and/or at least an impedance of an antenna (e.g. antenna impedance 444) of the first circuit 402 or of the second circuit 410.

The system 400 can include controller circuit 420 that is configured to determine the configuration 452 by identifying the configuration as a configuration having a highest score (e.g., score 442) amongst the one or more scores 442 of the one or more configurations 452 corresponding to the state 422. The determination can be made by identifying the configuration from a data structure (e.g., data structure 446). The data structure 446 can include one or more configurations corresponding to the state. For example, the data structure 446 can include amplifier voltage 436, amplifier bias 438, amplifier ICQ 440, and/or antenna impedance 444.

The system 400 can include a controller circuit 420 that is configured to determine the configuration 452 by identifying, from a data structure 446 comprising one or more configurations 452 corresponding to the state 422, the configuration 452 as a configuration having a score lower than a highest score. The highest score can be the score that is highest among the one or more scores 442 of the one or more configurations 452 corresponding to the state 422. The score 442 can be identified in response to the configuration 452 corresponding to the highest score 442 from the one or more scores 442 being unsuitable.

The system 400 can include the controller circuit 420 which includes a memory (e.g., memories 448) configured to store a data structure 446. The data structure can include a plurality of states of the first circuit (e.g., first signal power 424, first frequency 426, or first modulation 428) and a plurality of states of the second circuit (e.g., second signal power 430 or second frequency 432). Each of the states can correspond to one or more configurations for operating at least one of the first circuit 402 or the second circuit 410. Each of the one or more configurations 452 can have a respective score of the plurality of scores 442. For example, the first signal power 424 can indicate that the configuration controller 434 should operate a configuration 452. The configuration controller 434 could choose a state according to the highest score 422 associated with a configuration corresponding to the state, first signal power 424.

The present disclosure can relate to a wearable device 200 that can include a non-transitory computer readable medium 232. The non-transitory computer readable medium 232 can store program instructions for causing at least one processor 230 of a device to identify that a first circuit 402 configured for a first wireless communications protocol 404 caused interference with a second circuit. For example, the at least one processor 230 can communicate with the loss determiner 414 to identify a loss in the signal of wireless communication protocols 404 or 412.

The wearable device 200 can include a non-transitory computer readable medium 232 that can store program instructions for causing at least one processor 230 of a device to determine a loss caused by the interference (i.e., the loss determiner 414) at the second circuit 410 configured for a second wireless communications protocol 412. The wearable device 200 can include a non-transitory computer readable medium 232 that can store program instructions for causing at least one processor 230 of a device to determine, in response to the loss exceeding a defined threshold (e.g., as stored in data structures 446) and according to a state of the first circuit 402 and the second circuit 410 (e.g., states 422), a configuration (e.g., configurations 452) for operating at least one of the first circuit 402 or the second circuit 410. The state can include a power of a signal of the second wireless communication protocol (e.g., second signal power 430) received at the second circuit. The state can include at least one of: a frequency of the first circuit (e.g., first frequency 426), a modulation setting of the first circuit (e.g., first modulation 428), a power of a signal of the first wireless communications protocol (e.g., first signal power 424) or a frequency of the second circuit (e.g., second frequency 432). The program instructs can cause at least one processor 230 of the device to apply the configuration to at least one of the first circuit 402 or the second circuit 410 to adjust the loss.

The wearable device 200 can include a non-transitory computer readable medium 232 that can store program instructions which can cause the at least one processor to adjust at least one of: a voltage supplied to the amplifier (e.g., amplifier voltage 436), a bias of the amplifier (e.g., amplifier bias 438) or a collector current at a bias point of the amplifier (ICQ) (e.g., amplifier ICQ 440). The program instructions can also operate an amplifier (e.g., power amplifier 408) of the first circuit 402 in a high linearity mode based on the adjusting.

The wearable device 200 can include a non-transitory computer readable medium 232 that can store program instructions which can cause the at least one processor to operate the amplifier of the first circuit (e.g., power amplifier 408) in a normal linearity mode, in response to the loss being below the defined threshold or the interference not occurring.

The wearable device 200 can include a non-transitory computer readable medium 232 that can store program instructions which can cause the at least one processor to adjust a supply voltage (e.g., amplifier voltage 436) of an amplifier 408 of the first circuit 402, a bias of the amplifier (e.g., amplifier bias 438) of the first circuit 402, or an ICQ of the amplifier (e.g., 440) of the first circuit 402. The program instructions can also cause the at least one processor to adjust at least an impedance of an antenna (e.g., antenna impedance 444) of the first circuit 402 or an impedance of an antenna (e.g., antenna impedance 444) of the second circuit 410.

Figure 6:
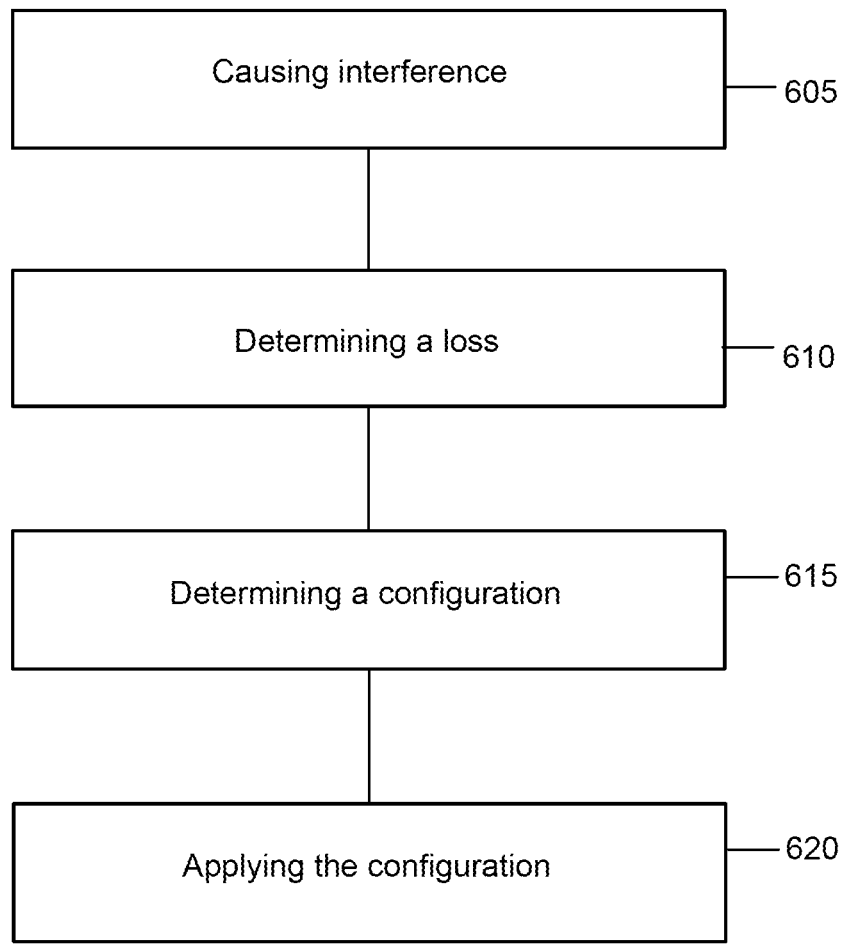
FIG. 6 is a flowchart showing an example method of reducing loss caused by an interference between two wireless circuits.

FIG. 6 depicts an example of a method 600 of reducing a wireless signal loss caused by interference between two wireless circuits. Method 600 can include acts 605-620. Method 600 can perform the actions using any components or features herein, such as those discussed in system 400, discussed in connection with FIG. 4. At act 605, an interference is caused. For example, the interference can be caused by an aggressor first circuit 402 against victim second circuit 410. At act 610, a loss is determined. For example, the loss can be determined by the second circuit 410 or the controller circuit 420. At act 615, a configuration is determined. For example, the configuration can include any combination of configurations 434 that correspond to particular states 422 detected in the aggressor and/or victim circuits. At act 620, the configuration is applied. For example, the system can identify a configuration 452 that can be applied against the circuits 402 or 410 to reduce the loss below an acceptable threshold level.

At act 605, an interference is caused. A first circuit configured for a first wireless communications protocol (e.g., an aggressor) can cause interference with a second circuit (e.g., a victim). The first circuit can be a circuit operating using a first wireless communication protocol (e.g., any one of a WiFi, cellular or Bluetooth communication protocol) and it can cause interference with a second circuit, which can use a second wireless communication protocol (e.g., any one of a WiFi, cellular or Bluetooth communication protocol). The interference can be an interference causing loss that exceeds a predetermined threshold for an acceptable or tolerable amount of loss due to wireless signal interference between the two RF circuits.

The interference can be caused by states or parameters of the first (e.g., aggressor) and the second (e.g., victim) circuits. The interference can be caused, at least in part, due to a combination of power or frequency by both the aggressor and the victim circuit. The interference can be caused, at least in part, due to modulation of the aggressor circuit. The interference can be caused by any combination of states or parameters of the aggressor circuit, victim circuit or both aggressor and victim circuits.

At act 610, a loss is determined. The second circuit configured for a second wireless communications protocol can determine a loss caused by the interference. In some implementations, a controller circuit can determine the loss caused by the interference. The loss caused by the interference can be determined to be greater than a predetermined threshold for an acceptable or a tolerable loss. The loss can be determined in response to the loss exceeding a predetermined threshold for an acceptable amount of loss due to radio coexistence.

The loss can be determined by the loss determiner 414, which can be included in the victim circuit, the aggressor circuit or the control circuit. The loss determiner 414 can determine the loss by monitoring or comparing the expected and received signals. The loss determiner can compare various aspects of the signals, such as SNR, distortion, and amplitude.

At act 615, a configuration is determined. The control circuit can determine, in response to the loss exceeding a defined threshold and according to a state of the first circuit and the second circuit, a configuration for operating at least one of the first circuit or the second circuit. The control circuit can determine the configuration for the first circuit, the second circuit or a combination of the first and the second circuits. The control circuit can determine the configuration based on or using one or more states. One or more states can include a power of a signal of the second wireless communication protocol received at the second circuit, and at least one of: a frequency of the first circuit, a modulation setting of the first circuit, a power of a signal of the first wireless communications protocol or a frequency of the second circuit. The one or more states can include any combination of one, two, three, four or five of: a power of a signal of the second wireless communication protocol received at the second circuit, a frequency of the first circuit, a modulation setting of the first circuit, a power of a signal of the first wireless communications protocol or a frequency of the second circuit.

The controller circuit can identify, from a data structure comprising one or more configurations corresponding to the state, the configuration as a configuration having a highest score amongst the one or more scores of the one or more configurations corresponding to the state. The controller circuit can determine the configuration for operating at least one of the first circuit or the second circuit based on the identifying. The controller circuit can identify, from a data structure comprising one or more configurations corresponding to the state, the configuration as a configuration having a score lower than a highest score amongst the one or more scores of the one or more configurations corresponding to the state. The score identified in response to the configuration corresponding to the highest score from the one or more scores can be unsuitable or unavailable. The controller circuit can determine the configuration for operating at least one of the first circuit or the second circuit based on the identifying. A memory can store a data structure. The data structure can include a plurality of states of the first circuit and the second circuit. Each of the states can correspond to one or more configurations for operating at least one of the first circuit or the second circuit. Each of the one or more configurations can have a respective score. As an example, the controller circuit can identify that the state of the first signal power 424 is suffering/degraded, from comparison within the data structure. The controller circuit can identify that a modification of the first power amplifier 408's voltage 436 would increase the linearity of the first signal.

At act 620, the configuration is applied. The controller circuit can apply the configuration to at least one of the first circuit or the second circuit to adjust the loss. The controller circuit can operate an amplifier of the first circuit in a high linearity mode based on the adjusting. The controller circuit can operate the amplifier of the first circuit in a normal linearity mode, in response to the loss being below the defined threshold or the interference not occurring. As an example, the controller circuit could modify the supply voltage to the first circuit to increase the linearity of the first wireless communication protocol 404.

The controller circuit can adjust at least one of: a voltage supplied to the amplifier, a bias of the amplifier or a collector current at a bias point of the amplifier (ICQ). The controller circuit can adjust at least one of an impedance of an antenna of the first circuit or an impedance of an antenna of the second circuit. The controller circuit can adjust a supply voltage of an amplifier of the first circuit, a bias of the amplifier of the first circuit, an ICQ of the amplifier of the first circuit and at least an impedance of an antenna of the first circuit or an impedance of an antenna of the second circuit.

Figure 7:
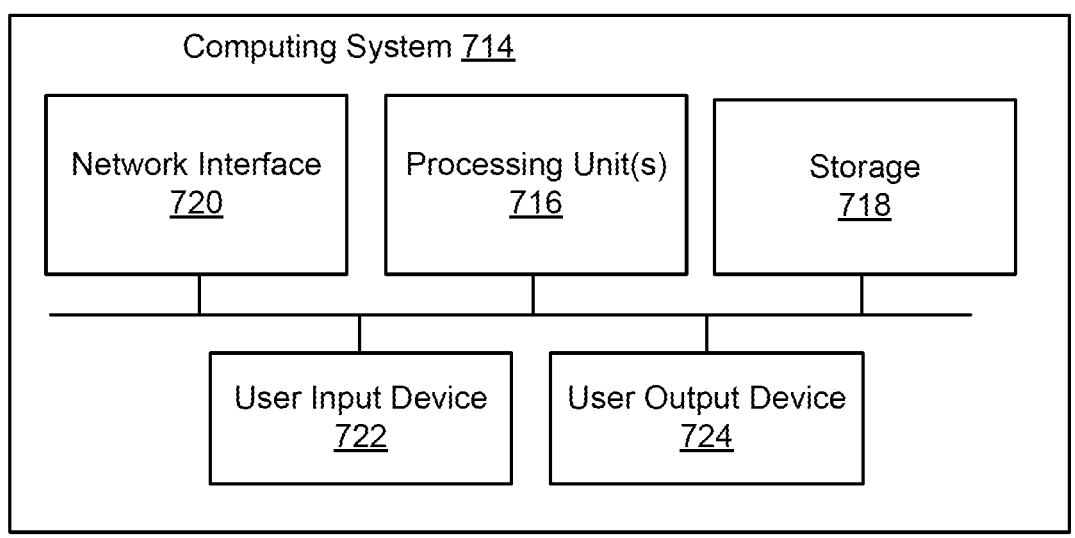
FIG. 7 is a block diagram of a computing environment according to an example implementation of the present disclosure.

FIG. 7 shows a block diagram of a representative computing system 714 usable to implement the present disclosure. In some embodiments, the communication device 120, the wearable device 150 or 110 or both of FIG. 1 are implemented by the computing system 714. Computing system 714 can be implemented, for example, as a consumer device such as a smartphone, other mobile phone, tablet computer, wearable computing device (e.g., smart watch, eyeglasses, or head wearable display), desktop computer, laptop computer, or implemented with distributed computing devices. The computing system 714 can be implemented to provide VR, AR, MR experience. In some embodiments, the computing system 714 can include conventional computer components such as processors 716, storage device 718, network interface 720, user input device 722, and user output device 724.

Network interface 720 can provide a connection to a wide area network (e.g., the Internet) to which WAN interface of a remote server system is also connected. Network interface 720 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

The network interface 720 may include a transceiver to allow the computing system 714 to transmit and receive data from a remote device (e.g., an AP, a STA) using a transmitter and receiver. The transceiver may be configured to support transmission/reception supporting industry standards that enables bi-directional communication. An antenna may be attached to transceiver housing and electrically coupled to the transceiver. Additionally or alternatively, a multi-antenna array may be electrically coupled to the transceiver such that a plurality of beams pointing in distinct directions may facilitate in transmitting and/or receiving data.

A transmitter may be configured to wirelessly transmit signals, scores, frames, slots, or symbols generated by the processor unit 716. Similarly, a receiver may be configured to receive signals, scores, states, configurations or symbols and the processor unit 716 may be configured to process the signals, scores, states, configurations or symbols. For example, the processor unit 716 can be configured to determine a type of state and to process the state and/or fields of the state accordingly.

User input device 722 can include any device (or devices) via which a user can provide signals to computing system 714; computing system 714 can interpret the signals as indicative of particular user requests or information. User input device 722 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 724 can include any device via which computing system 714 can provide information to a user. For example, user output device 724 can include a display to display images generated by or delivered to computing system 714. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 724 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 716 can provide various functionality for computing system 714, including any of the functionality described herein as being performed by a server or client, or other functionality associated with message management services.

It will be appreciated that computing system 714 is illustrative and that variations and modifications are possible. Computer systems used in connection with the present disclosure can have other capabilities not specifically described here. Further, while computing system 714 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Figure 8:
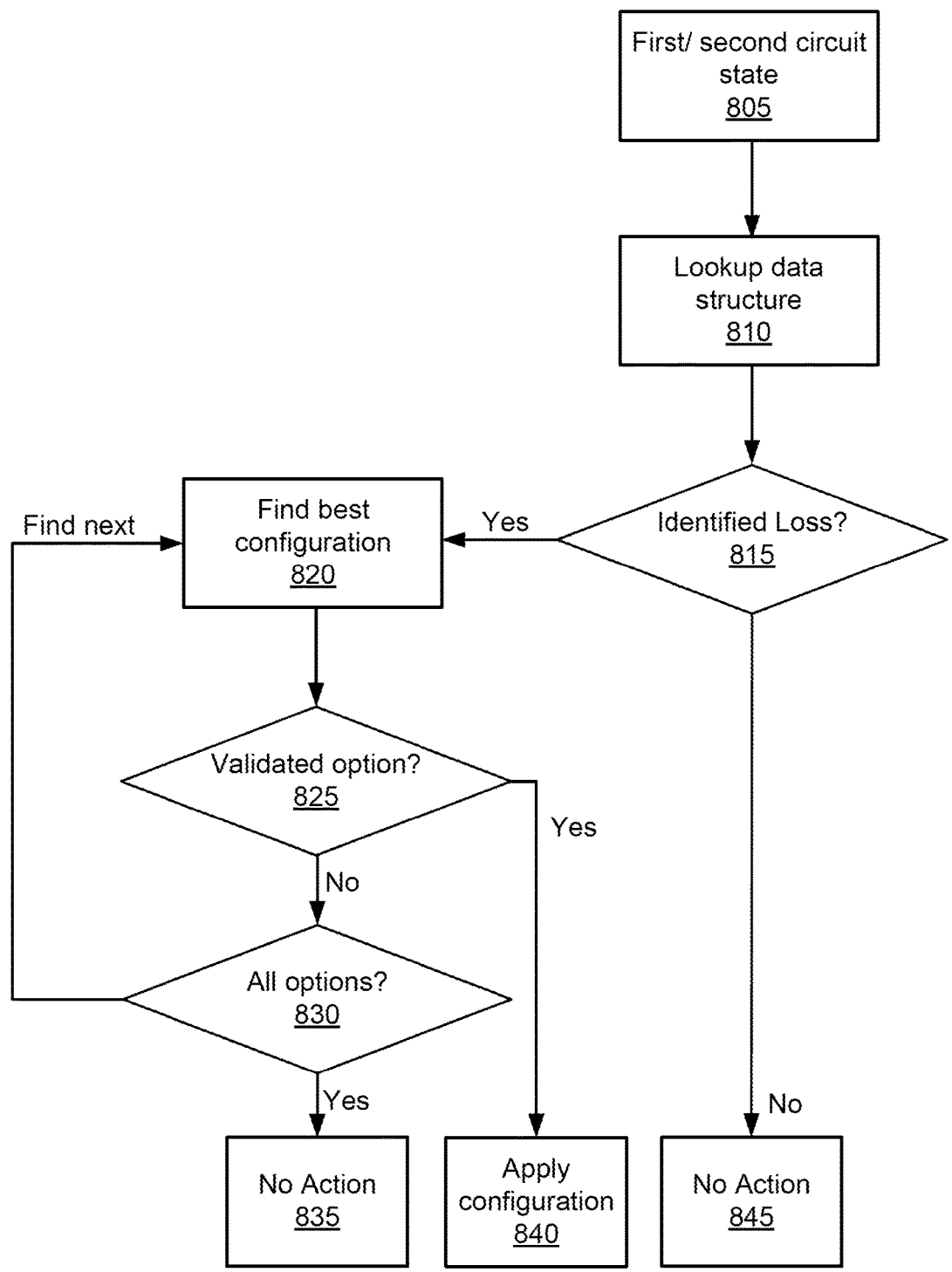
FIG. 8 is a flowchart showing a process of choosing mitigation actions for coexistence of radio signals, according to an example implementation of the present disclosure.

FIG. 8 depicts an example of a flowchart 800 showing a process of choosing mitigation actions (e.g., configurations) for reducing loss due to coexistence of radio signals, according to an example implementation of the present disclosure. Method 800 can include acts 805-845. Method 800 can perform the actions using any components or features herein, such as those discussed in system 400, discussed in connection with FIG. 4. At act 805, a system can establish a state of a first and a second circuit. At act 810, the system can access a lookup data structure. At act 815, the system can utilize a loss determiner to identify a loss experienced by the victim circuit. At act 820, the system can determine the best configuration to apply as the corrective action on the aggressor and/or victim circuits. At act 825, the system can validate the best configuration. At act 830, the system can explore or consider all options, such as alternative configurations to identify if any alternatives with higher scores are now available. At act 835, system can determine that no action may be taken. At act 840, the system can apply to the aggressor and victim circuits the validated configuration (e.g., the available configurations with the highest score). At act 845, the system can determine to take no further action.

At act 805, a first and second circuit state is established. The state can include the state of the first and second circuits (e.g., aggressor and victim circuits), such as for example discussed in reference to FIG. 4. The state can be established by a circuit monitor. The state can be defined by any combination of a first signal power, a first frequency, a first modulation, a second signal power, or a second frequency. The circuit monitor can detect the state of the first circuit and/or the second circuit. The state can be stored in a memory by the one or more processors. The established state can change in response to a detection by the circuit monitors. The established state can prompt the one or more processors to access a lookup data structure.

At act 810, a lookup data structure is accessed. The lookup data structure can be accessed in response to an establishment of a first or second circuit state. The lookup data structure can be a chart, table, list, or other data structure. The lookup data structure can include a state (e.g., a lookup condition). The state can include at least a first (e.g., aggressor) signal power, a first (e.g., aggressor) frequency, a first (e.g., aggressor) modulation, a second (e.g., victim) signal power, or a second (e.g., victim) frequency. The lookup data structure can include configurations (e.g., mitigation actions). The configurations can include at least the amplifier voltage, amplifier bias, amplifier ICQ, or antenna impedance. The lookup data structure can include a score according to at least the state or configuration. The score can indicate a beneficial action to take to optimize radio coexistence.

At act 815, a loss is identified. A loss can be determined by the control circuit or by the loss determiner in response to an indication that a loss due to signal interference has occurred that exceeds a predetermined threshold or tolerance. The loss (e.g., in units of dB) can be indicative of, for example, a loss in amplitude or strength of the wireless communication signal, or can be indicative of an increase in wireless signal distortion, phase shift, or noise. If, at act 815, no loss is identified, the method can proceed to act 845, no action. If, at act 815, a loss is identified, the process can seek the best configuration.

At act 820, the best configuration is determined. The best configuration can be determined in response to a score found in the lookup table. For example, a score could indicate an ideal configuration based at least upon the state. The best configuration can refer to the most ideal operating conditions or configurations (e.g., mitigation actions) which can be taken to reduce the identified loss. The best configuration can be determined from a lookup table. The best configuration can be determined iteratively. In an embodiment, the best configuration determination process can be completed when a validated option is found.

At act 825, the best configuration is validated. Validating the best configuration can refer to ensuring that the chosen best configuration is applicable. For example, a best configuration may not be validated if the best configuration includes altering the antenna's impedance and it is determined that altering the antenna's impedance would cause a disconnection of the first or second wireless communication signal. For example, a best configuration may not be validated if the best configuration includes increasing the supply voltage to the power amplifier, but the device is operating in a battery saving mode. If the best configuration of act 820 is validated in act 825, the configuration can be applied. If the best configuration of act 820 is not validated in act 825, the process can explore all options.

At act 830, all options are explored. All options can refer to the configurations which have not been deemed invalid by act 825. All options can be stored in the lookup data structure. Exploring all options can refer to checking to see if any configurations remain which have not been through validation. If, for example, all options have been deemed to be invalid, the device performing act 830 can determine that all options have been explored and can instruct the process to take no action. If, for example, all options have not been deemed to be invalid, act 830 can call again on act 820 to find a next best configuration.

At act 835, no action is taken. No action can be taken in response to a determination that all options have been explored and deemed to be invalid. No action can mean that the current configuration is the best configuration and that no action to change should be taken. No action can mean that there is no action which the process can take which would improve the wireless signal communication. No action can mean that there is no action which the process can take which would not harm the wireless signal communication.

At act 840, the validated configuration is applied. The validated configuration can be applied in response a determination that the configuration is both best and valid, via acts 820 and 825 respectively. Applying the configuration can refer to transmitting a signal, instructions, or power to the controller. Applying the configuration can refer to the controller causing a change in the wireless communication protocols, first or second circuits, or another component of the device. Act 840 can cause a change to the control circuit, first circuit, or second circuit, in response to the determined best and valid configuration. For example, act 840 can include the controller changing the bias of the power amplifier. Applying the configuration can include applying more than one configuration and in varying degrees. For example, act 840 can include increasing the supply voltage to the second power amplifier by 0.5V and also lowering the amplifier bias by 3 mA.

At act 845, no action is taken. No action can be taken in response to no identification of loss from act 815. For example, if no loss is identified, the process will take no further action. This could be for example because the coexisting signals have not created a loss exceeding a determined threshold or tolerance, or because the user has opted out of coexistence mitigation options.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A device comprising:
a first circuit configured for a first wireless communications protocol;
a second circuit configured for a second wireless communications protocol, the second circuit configured to determine a loss caused by an interference from the first wireless communications protocol; and
a controller circuit configured to:
determine, in response to the loss exceeding a defined threshold and according to a state of the first circuit and the second circuit, a configuration for operating at least one of the first circuit or the second circuit, the state comprising: (i) a power of a signal of the second wireless communication protocol received at the second circuit, and (ii) at least one of: a frequency of the first circuit, a modulation setting of the first circuit, a power of a signal of the first wireless communications protocol or a frequency of the second circuit; and
apply the configuration to at least one of the first circuit or the second circuit to adjust the loss.

2. The device of claim 1, wherein the controller circuit is configured to operate an amplifier of the first circuit in a high linearity mode by adjusting at least one of: a voltage supplied to the amplifier, a bias of the amplifier or a collector current at a bias point (ICQ) of the amplifier.

3. The device of claim 2, wherein the controller circuit is configured to operate the amplifier of the first circuit in a normal linearity mode, in response to the loss being below the defined threshold or an absence of the interference.

4. The device of claim 2, wherein the controller circuit is configured to adjust at least one of an impedance of an antenna of the first circuit or an impedance of an antenna of the second circuit.

5. The device of claim 1, wherein the controller circuit is configured to adjust a voltage supplied to an amplifier of the first circuit, a bias of the amplifier of the first circuit, a collector current at a bias point (ICQ) of the amplifier of the first circuit and at least one of an impedance of an antenna of the first circuit or an impedance of an antenna of the second circuit.

6. The device of claim 1, wherein the controller circuit is configured to determine the configuration by identifying, from a data structure comprising one or more configurations corresponding to the state, the configuration as a configuration having a highest score among one or more scores of the one or more configurations corresponding to the state.

7. The device of claim 1, wherein the controller circuit is configured to determine the configuration by identifying, from a data structure comprising one or more configurations corresponding to the state, the configuration as a configuration having a score lower than a highest score among one or more scores of the one or more configurations corresponding to the state, the score identified in response to the configuration corresponding to the highest score being unsuitable.

8. The device of claim 1, comprising a memory configured to store a data structure comprising: a plurality of states of the first circuit and the second circuit, each of the states corresponding to one or more configurations for operating at least one of the first circuit or the second circuit, each of the one or more configurations having a respective score.

9. A method, comprising:
causing, by a first circuit configured for a first wireless communications protocol, interference to a second circuit configured for a second wireless communications protocol;
determining, by the second circuit, a loss caused by the interference;
determining, by a controller circuit, in response to the loss exceeding a defined threshold and according to a state of the first circuit and the second circuit, a configuration for operating at least one of the first circuit or the second circuit, the state comprising: (i) a power of a signal of the second wireless communication protocol received at the second circuit, and (ii) at least one of: a frequency of the first circuit, a modulation setting of the first circuit, a power of a signal of the first wireless communications protocol or a frequency of the second circuit; and
applying, by the controller circuit, the configuration to at least one of the first circuit or the second circuit to adjust the loss.

10. The method of claim 9, comprising:
adjusting at least one of: a voltage supplied to an amplifier, a bias of the amplifier or a collector current at a bias point (ICQ) of the amplifier; and
operating, by the controller circuit, the amplifier of the first circuit in a high linearity mode according to the adjusting.

11. The method of claim 10, comprising:
operating, by the controller circuit, the amplifier of the first circuit in a normal linearity mode, in response to the loss being below the defined threshold or an absence of the interference.

12. The method of claim 10, comprising:
adjusting, by the controller circuit, at least one of an impedance of an antenna of the first circuit or an impedance of an antenna of the second circuit.

13. The method of claim 9, comprising:
adjusting, by the controller circuit, a voltage supplied to an amplifier of the first circuit, a bias of the amplifier of the first circuit, a collector current at a bias point (ICQ) of the amplifier of the first circuit and at least one of an impedance of an antenna of the first circuit or an impedance of an antenna of the second circuit.

14. The method of claim 9, wherein determining the configuration for operating the at least one of the first circuit or the second circuit comprises:
identifying, by the controller circuit from a data structure comprising one or more configurations corresponding to the state, the configuration as a configuration having a highest score among one or more scores of the one or more configurations corresponding to the state.

15. The method of claim 9, wherein determining the configuration for operating the at least one of the first circuit or the second circuit comprises:
identifying, by the controller circuit from a data structure comprising one or more configurations corresponding to the state, the configuration as a configuration having a score lower than a highest score amongst the one or more scores of the one or more configurations corresponding to the state, the score identified in response to the configuration corresponding to the highest score being unsuitable.

16. The method of claim 9, comprising:
storing, by a memory, a data structure comprising: a plurality of states of the first circuit and the second circuit, each of the states corresponding to one or more configurations for operating at least one of the first circuit or the second circuit, each of the one or more configurations having a respective score.

17. A non-transitory computer readable medium storing program instructions for causing at least one processor of a device to:
determine a loss caused by interference from a first circuit configured for a first wireless communications protocol, to a second circuit configured for a second wireless communications protocol;
determine, in response to the loss exceeding a defined threshold and according to a state of the first circuit and the second circuit, a configuration for operating at least one of the first circuit or the second circuit, the state comprising: (i) a power of a signal of the second wireless communication protocol received at the second circuit, and (ii) at least one of: a frequency of the first circuit, a modulation setting of the first circuit, a power of a signal of the first wireless communications protocol or a frequency of the second circuit; and
apply the configuration to at least one of the first circuit or the second circuit to adjust the loss.

18. The non-transitory computer readable medium of claim 17, wherein the program instructions cause the at least one processor to:
adjust at least one of: a voltage supplied to an amplifier, a bias of the amplifier or a collector current at a bias point (ICQ) of the amplifier; and
operate the amplifier of the first circuit in a high linearity mode according to the adjusting.

19. The non-transitory computer readable medium of claim 17, wherein the program instructions cause the at least one processor to operate an amplifier of the first circuit in a normal linearity mode, in response to the loss being below the defined threshold or an absence of the interference.

20. The non-transitory computer readable medium of claim 17, wherein the program instructions cause the at least one processor to adjust a voltage supplied to an amplifier of the first circuit, a bias of the amplifier of the first circuit, a collector current at a bias point (ICQ) of the amplifier of the first circuit and at least one of an impedance of an antenna of the first circuit or an impedance of an antenna of the second circuit.

\* \* \* \* \*